(12) United States Patent
Sakai et al.

(10) Patent No.: US 6,381,156 B1
(45) Date of Patent: Apr. 30, 2002

(54) UNINTERRUPTIBLE DUPLEXED POWER SUPPLY SYSTEM, AND UNIT PLUG-IN STRUCTURE FOR UNINTERRUPTIBLE DUPLEXED POWER SUPPLY SYSTEM

(75) Inventors: Setsuo Sakai; Tsurayoshi Imanishi, both of Amagasaki (JP)

(73) Assignee: Nihon Protector Co., Ltd., Amagasaki (JP)

( * ) Notice: Subject to any disclaimer, the term of this patent is extended or adjusted under 35 U.S.C. 154(b) by 0 days.

(21) Appl. No.: 09/770,375

(22) Filed: Jan. 29, 2001

(30) Foreign Application Priority Data

Sep. 8, 2000 (JP) ........................................ 2000-272478

(51) Int. Cl.[7] .................................................. H02J 7/00
(52) U.S. Cl. .............................. 363/65; 307/66; 307/82
(58) Field of Search ........................... 363/65, 67, 69, 363/70, 71; 307/64, 66, 71, 72–75, 82

(56) References Cited

U.S. PATENT DOCUMENTS

| | | | |
|---|---|---|---|
| 5,513,088 A | * | 4/1996 | Williamson ................... 363/20 |
| 5,602,462 A | * | 2/1997 | Stich et al. ................... 323/258 |
| 5,909,360 A | * | 6/1999 | Lavin et al. .................... 363/21 |
| 6,212,081 B1 | * | 4/2001 | Sakai ........................... 363/71 |
| 6,218,744 B1 | * | 4/2001 | Zahrte, Sr. et al. ........... 307/64 |

* cited by examiner

*Primary Examiner*—Matthew Nguyen
(74) *Attorney, Agent, or Firm*—Armstrong, Westerman & Hattori, LLP

(57) ABSTRACT

It is an object of the present invention to provide an uninterruptible duplexed power supply system that is highly reliable and has excellent durability, with which a more compact size and higher efficiency are both achieved, and with which a malfunction of the power supply circuit can be repaired in a live state. The present invention is characterized in that there are provided a first unit 4 and a second unit 6 having their own power supplies 1, a main component 10 to which the outputs of the first unit 4 and second unit 6 are inputted is equipped with a secondary DC output circuit 8 and a battery-side converter circuit 13, the first unit 4 and the second unit 6 can be attached to and detached from the main component 10 in a live state.

7 Claims, 9 Drawing Sheets

UNINTERRUPTIBLE DUPLEXED POWER SUPPLY SYSTEM, AND UNIT PLUG-IN STRUCTURE FOR UNINTERRUPTIBLE DUPLEXED POWER SUPPLY SYSTEM

BACKGROUND OF THE INVENTION

1. Field of the Invention

The present invention relates to an uninterruptible duplexed power supply system for driving a load by the rectified output from a commercial alternating current power supply (AC), for instance, during normal operation and for driving the load by the output from a direct current power supply such as a rechargeable battery in the event of an abnormality such as a power outage, and more particularly relates to an uninterruptible duplexed power supply system used for the operation of critical devices such as burglar alarms, fire alarms, communications systems, information systems (such as server computers and factory automation personal computers), precision medical devices, and automated machinery, and to a unit plug-in structure for an uninterruptible duplexed power supply system. "Power outage" as used herein refers to the cutoff of the supply of power (current), such as when the power supplied from an electric company is cut off, or when the supplied power is cut off because a breaker is tripped, a device is unplugged, a wire is cut, or the like.

2. Description of the Related Art

Continuous, uninterrupted operation 24 hours a day for five years, for example, is required of server computers and the like in particular, and the power supply system shown in FIG. 9, for instance, is typical of the structure thereof. This system comprises an uninterruptible power supply (UPS) 90 connected to a commercial AC power supply, two switching power supplies 91 and 92 to which the switching power supply that serves as the server computer power supply is connected in parallel for the sake of safety (duplexing), and two sets of diodes 93 and 94 for preventing the current outputted from either of these switching power supplies 91 and 92 from sneaking into the other switching power supply, and is designed so that electrical power can be supplied at all times to the load. Therefore, if the switching power supply 91 should suffer a malfunction due to a lightning surge, any of various impulse surges, or the like being introduced into the AC input line, then the other switching power supply 92 will take over and be able to supply power to the load.

With the above structure, because the switching power supplies 91 and 92 are connected in series to the uninterruptible power supply 90, the total efficiency, which is obtained by multiplying the 75 to 80% efficiency of the switching power supplies 91 and 92 by the 75 to 80% efficiency of the uninterruptible power supply 90, is only about 55 to 64%, so there is a problem with energy loss.

Another problem is that because the uninterruptible power supply 90 and the two switching power supplies 91 and 92 are all separate components, not only is a large amount of space required, but the cost is also high.

Also, the two diodes 93 and 94 for preventing sneak current are required for each of the two switching power supplies 91 and 92, so a total of four or more diodes are required, which makes the system bulkier and leads to lower efficiency through diode forward loss.

The inventors have previously proposed a solution to the above problems. This is discussed in Japanese Patent No. 2,702,048, in which a primary circuit, equipped with a rectification circuit for rectifying the alternating current from a commercial AC power supply and switching elements or the like provided on the output side of this rectification circuit, is connected to the primary winding of a high-frequency transformer, a secondary DC output circuit that supplies power to the load is connected to the secondary winding of this high-frequency transformer, and a battery-side converter circuit equipped with switching elements or the like for operating according to the operating state of the primary circuit is connected to the tertiary winding of the high-frequency transformer. The result is an uninterruptible switching regulator (uninterruptible duplexed power supply system) that integrates the primary circuit (AC power supply circuit), the battery-side converter circuit, the switching circuit provided on the output side of these, and the secondary DC output circuit that supplies power to the load.

Nevertheless, although the load can be driven on an emergency basis by the battery-side converter circuit if the primary circuit should suffer a malfunction, the damaged parts in the malfunctioned primary circuit have to be replaced. This replacement requires that the computer be temporarily shut down by a specific operation, and the power supply then turned off, and this shutdown operation is not only troublesome, but the computer cannot be operated during the replacement work, resulting in the problem that the safety and reliability of the power supply cannot be fully ensured.

It is also difficult in structural terms to perform the above-mentioned replacement of damaged parts in the primary circuit right in the middle of (for a short time) the drive of the load by the battery-side converter circuit.

Accordingly, the method that had to be adopted up to now was to connect the above-mentioned uninterruptible switching regulator (uninterruptible duplexed power supply system) in parallel, just as with the switching power supplies 91 and 92 in FIG. 9. Furthermore because the connection is in parallel, the diodes 93 and 94 in FIG. 9 are needed to prevent sneak current, and the only effect is that the uninterruptible power supply (UPS) 90 is unnecessary, so there is still room for improvement in terms of reducing the size so as to take up less space, and lowering cost.

SUMMARY OF THE INVENTION

In light of the above situation, it is an object of the present invention to provide an uninterruptible duplexed power supply system that is highly reliable and has excellent durability, with which a more compact size and higher efficiency are both achieved, and with which a malfunction of the power supply circuit can be repaired in a live state.

In order to achieve the stated object, the present invention is characterized in. that there are provided a first unit that uses a first power supply as its input source and that houses a first primary circuit equipped with a switching element on the output side, and a second unit that uses the first power supply or a second power supply that is different from the first power supply and that houses a second primary circuit equipped with a switching element on the output side, a main component to which the outputs of the first unit and second unit are inputted comprises a primary winding of a high-frequency transformer to which the first unit and the second unit are connected via a connection component, a secondary DC output circuit that is connected to a secondary winding of the high-frequency transformer and supplies electrical power to a load, a PWM control circuit for keeping the output from this secondary DC output circuit at a constant voltage, and a battery-side converter circuit that is connected via a tertiary winding of the high-frequency transformer, is equipped with a switching element on the output side, and is used for charging a rechargeable battery for backup in the event of a power outage, the first unit and the second unit can be installed or removed in a live state between a connected state in which they are electrically connected to the two primary windings of the high-frequency transformer and a disconnected state in which this connected state has been released, and the output signals from the PWM control circuit are inputted to the gate circuits of the various switching elements of the first unit, second unit, and battery-side converter circuit.

Therefore, if the supply of power to the load is cut off due to a power outage in the input of the first unit and second unit, power can be instantaneously supplied from a rechargeable battery and the load can be driven on an emergency basis, without being shut down, for a time corresponding to the capacitance of the rechargeable battery. Also the durability of the power supply system can be enhanced compared to when only one unit is provided. Because two units are provided on the primary side so that two units are alternately driven, or when just one is driven during normal operation and the other is driven for emergency use, for example, and furthermore, even if one of the units should malfunction, the other unit can provide drive, allowing the load to be continuously driven even while the malfunctioning unit is being repaired. A commercial AC power supply may be used as the input for one of the two units, and the same commercial AC power supply as above, or a different power supply, such as a generator, a solar battery, or a rechargeable battery, may be used as the input for the other unit. If the voltage of the primary circuit drops below a specific voltage or drops to zero, then the switching element for the battery-side converter operating with the rechargeable battery as its input will switch from an idle or off state to an operating state and supply power from the rechargeable battery to the load as discussed above. The above-mentioned idle state refers to a state in which the switching element repeatedly turns on and off in synchronization with the switching element of the power supply circuit, but current does not flow.

After the unit containing the malfunctioned primary circuit has been removed, a unit containing a new (working) primary circuit is installed and the commercial AC power supply is once again turned on in a state in which the unit has been electrically connected to the primary winding of the high-frequency transformer. As a result, the switching element will switch to an idle or off state to halt the supply of power to the load by the battery-side converter circuit, and at the same time, the switching element of the connected unit automatically switches to an operating state, and the supply of power to the load by the battery-side converter circuit is switched to the supply of power by the unit, at, which point the switching of the power supply circuits is concluded.

When the input source of either the first unit or the second unit is a DC power supply, then the number of turns of the primary winding for connecting the first unit or second unit to the high-frequency transformer is changed to a number of turns corresponding to the DC voltage applied by the DC power supply.

Using a DC power supply for the input source as above allows the load to be driven by the DC power supply even if the commercial AC power supply should be cut off.

The first unit and the second unit can each be equipped with a load balancing terminal or a current balancing terminal, and the load balancing terminals or current balancing terminals of these units connected to each other, or a switching element drive pulse switching control circuit can be provided for switching the drive pulses for driving the switching elements of the first unit and second unit, and the drive of the two units controlled by this switching element drive pulse switching control circuit, thereby balancing the loads of the two units, or driving the two units at a preset balancing ratio, or driving the two units at a balancing ratio programmed into the computer that serves as the load.

If there are provided a malfunction detection circuit for detecting a malfunction of the first unit or second unit, a power outage detection circuit, an internal temperature detection circuit for detecting the internal temperatures of the two units, a cooling fan abnormal shutdown detection circuit for detecting the abnormal shutdown of a cooling fan, an input current detection circuit and current balancing detection circuit for the two units, and a charging control circuit for detecting the state of the rechargeable battery, such as the charge or discharge state of the rechargeable battery, the battery temperature, the remaining capacitance, or the estimated service life, and if maintenance is performed by transferring the detection signals from all of the above circuits by serial transfer to the computer that serves as the load, then the status of the uninterruptible duplexed power supply system can be ascertained and appropriate steps taken.

The present invention also provides a unit plug-in structure in an uninterruptible duplexed power supply system, wherein at least one of the first unit and second unit according to claim 1 is structured such that it can be plugged into a casing through an opening formed in the front thereof, the unit is provided with a connector capable of connecting to or separating from a connector provided to the casing side in the course of the plugging-in of the unit, and a plug-in operation member for pushing and moving the front of the unit when this unit is plugged in and for pulling and moving the unit when this unit is unplugged is attached to the casing so as to be swingable substantially around the horizontal axis.

Plugging the unit into the casing as above affords easy replacement and maintenance of the unit. Also, the swing force of the plug-in operation member is utilized as above so that the connectors whose numerous contacts have been fitted together when the unit was plugged in can be easily separated or connected. More specifically, when the unit is plugged in, the front of the unit is pushed and moved by the plug-in operation member, whereas when the unit is unplugged, the unit is pulled and moved by the plug-in operation member, which either connects or separates the connectors.

The plug-in operation member may be equipped with a latching component that latches with a latched component provided to the front of the unit when the plug-in operation member is swung in the plug-in direction of the unit and that unlatches when the plug-in operation member is swung in the unplugging direction of the unit, and fixing means may be provided for fixing the plug-in operation member to the casing in a state in which the unit has been completely plugged in.

This allows the plug-in operation member to be engaged with and disengaged from the unit merely by swinging the plug-in operation member as above. Also, fixing the plugin operation member to the casing by the fixing means in a state in which the unit has been completely plugged in effectively avoids the problem of the unit unintentionally coming unplugged.

The fixing means may comprise a latched component that is provided to the casing, a latching component provided to the plug-in operation member so as to be able to latch and unlatch the latched component, and a slot provided to a rotary shaft of the plug-in operation member so that the plug-in operation member will be able to move up and down when the unit has been completely plugged in.

With the above structure, the latching component of the plug-in operation member can be latched to or unlatched from the latched component on the casing side, and the unit fixed to or unfixed from the casing, merely by moving the plug-in operation member up or down in a state in which the unit has been completely plugged in.

DESCRIPTION OF THE PREFERRED EMBODIMENTS

Figure 1:
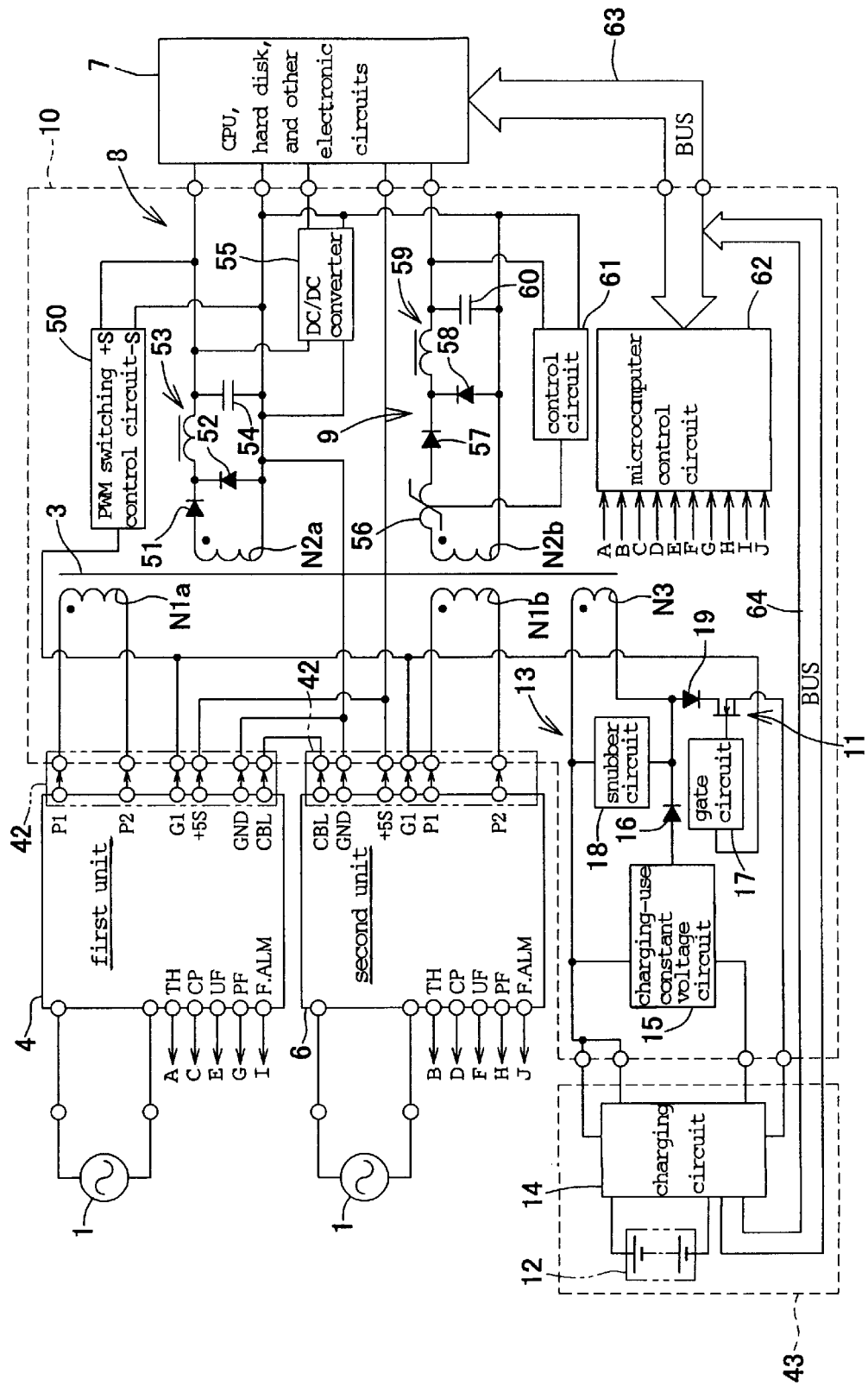
FIG. 1 is an electrical circuit diagram of an uninterruptible duplexed power supply system.
Figure 2:
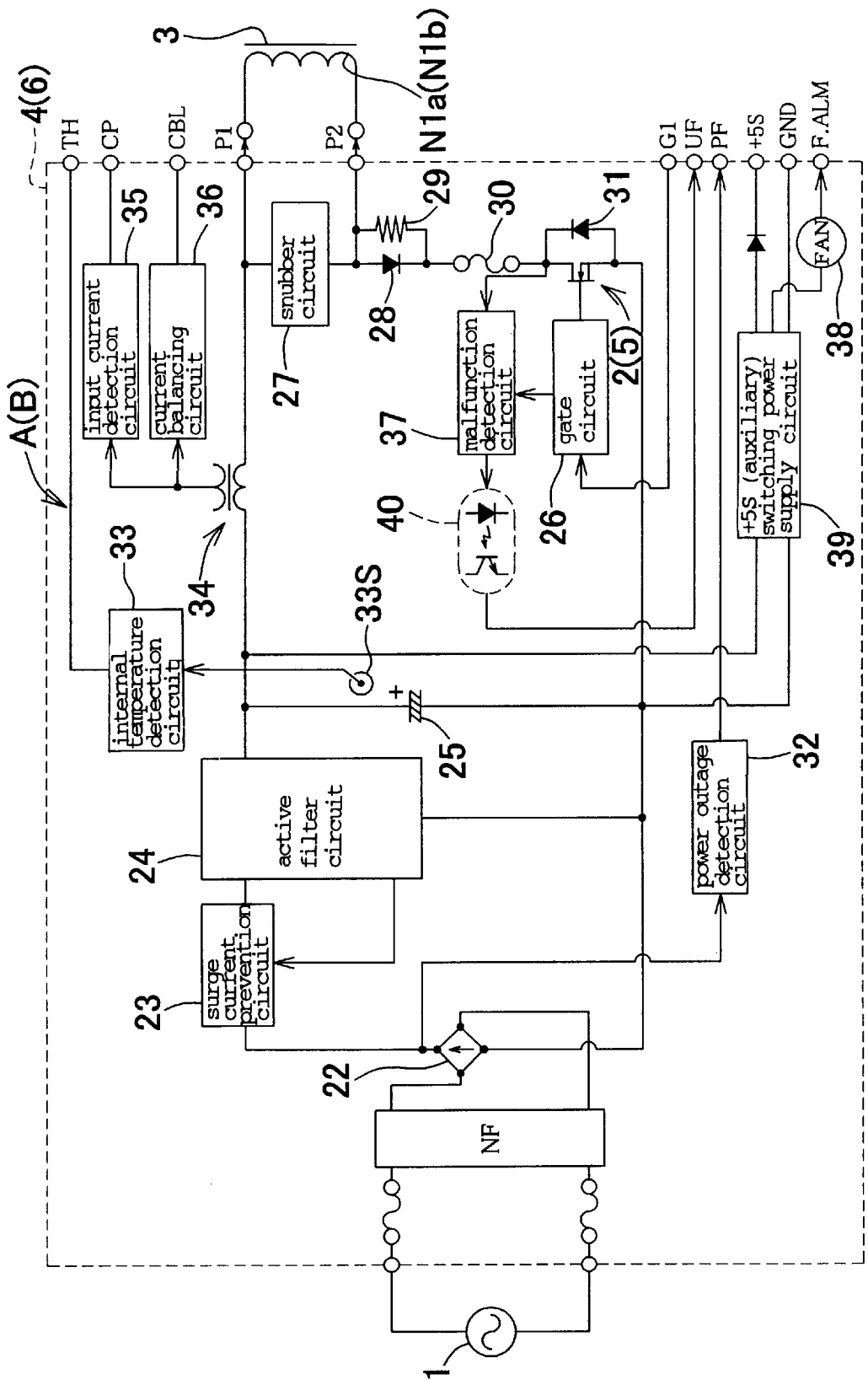
FIG. 2 is an electrical circuit diagram illustrating the specific structure of the first unit (second unit) in the uninterruptible duplexed power supply system.

FIGS. 1 and 2 show a forward-type uninterruptible duplexed power supply system. This uninterruptible duplexed power supply system comprises a first unit 4 for rectifying the alternating current from a commercial AC power supply 1 and outputting it to a first primary winding N1a of a high-frequency transformer 3 via a switching element 2 provided on the output side, a second unit 6 for similarly rectifying the alternating current from the commercial AC power supply 1 and outputting it to a second primary winding N1b of the high-frequency transformer 3 via a switching element 5 provided on the output side, and two secondary DC output circuits 8 and 9 that are connected in an electrically insulated state to secondary windings N2a and N2b of the high-frequency transformer 3 and that supply DC power to a load 7. A main component 10 to which the outputs from the two units 4 and 6 are inputted consists of the two primary windings N1a and N1b, the high-frequency transformer 3, the secondary windings N2a and N2b, the two secondary DC output circuits 8 and 9, and a battery-side converter circuit 13. A forward type is shown here as the power supply system, but a feedback type, full bridge type, half bridge type, or the like may be used instead, and any type of power supply system may be used.

There are provided a charging control circuit 14 and a charging-use constant voltage circuit 15 connected via a tertiary winding N3 of the high-frequency transformer 3, equipped with a switching element 11 on the output side, and used for charging a rechargeable battery 12 for backup in the event of a power outage.

Figure 3:
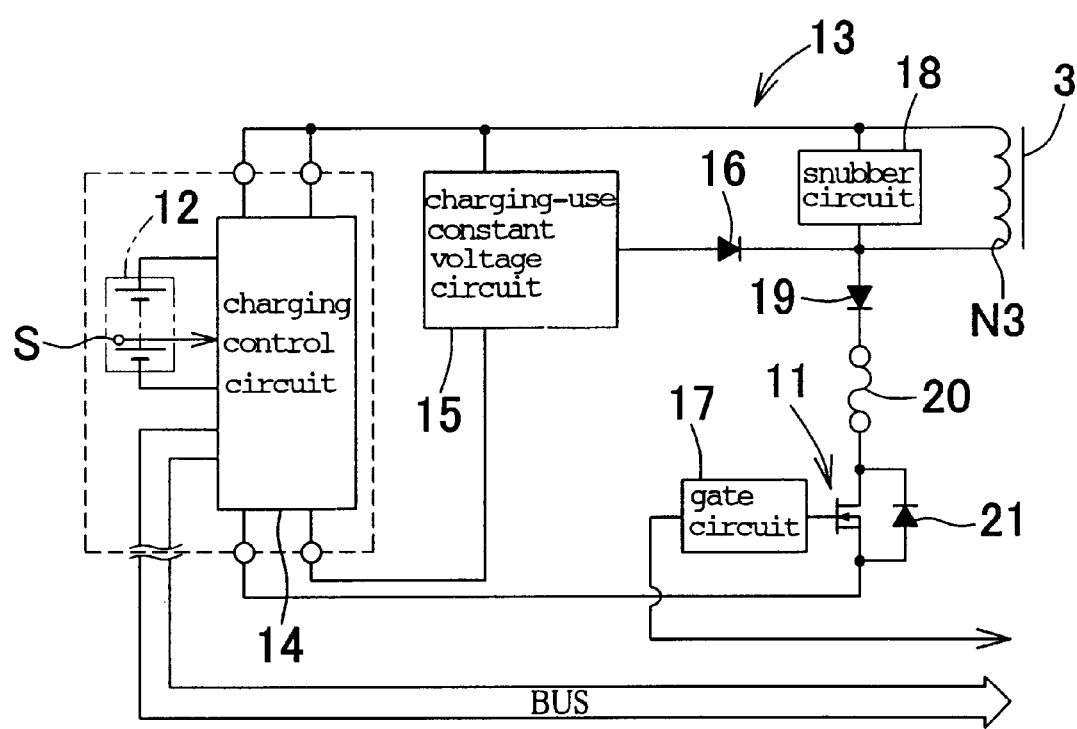
FIG. 3 is an electrical circuit diagram illustrating the specific structure of the battery-side converter circuit in the uninterruptible duplexed power supply system.

As shown in FIGS. 1 and 3, the battery-side converter circuit 13 comprises the charging control circuit 14 for charging the rechargeable battery 12, the charging-use constant voltage circuit 15 for applying a constant voltage to this charging control circuit 14, an anti-backflow diode 16 provided between this charging-use constant voltage circuit 15 and the tertiary winding N3, an FET 11 (switching element) that is operated by gate signals from a gate circuit 17 and is connected to the tertiary winding N3 of the high-frequency transformer 3, a snubber circuit 18 provided in order to absorb linking voltage or surge voltage affecting this switching element 11, an anti-backflow diode 19 for preventing the backflow of over current produced by induced voltage induced from the units 4 and 6 to the battery-side converter circuit 13, and a circuit cutoff fuse 20. 21 in the figure is a built-in diode of the FET 11, and S is a temperature sensor for measuring the temperature of the rechargeable battery 12. The detected information from this temperature sensor S is inputted to a microcomputer control circuit 62 (discussed below), information such as the charge or discharge state of the rechargeable battery 12, the remaining capacitance, and the estimated service life is detected by the charging control circuit 1.4, and this various information is transferred to a CPU that makes up part of the load 7 as serial signal output by a separately provided microcomputer that makes up a charging control circuit with the same structure as above. This transferred information may be displayed on the display screen of the CPU.

Since the first unit 4 and the second unit 6 have identical structures, only the first primary circuit A provided to the first unit 4 (the second unit has a second primary circuit B) will be described. As shown in FIG. 2, this circuit comprises a rectification circuit 22 for rectifying the alternating current from the commercial AC power supply 1, a surge current prevention circuit 23, an active filter circuit 24 (may be omitted) that serves to prevent higher-harmonic current, a smoothing capacitor 25 for storing the DC voltage from the active filter circuit 24, an FET 2 (switching element) operated by gate signals from the gate circuit 26 and connected to the primary winding N1a of the high-frequency transformer 3, a snubber circuit 27 (may be omitted) provided in order to absorb linking voltage or surge voltage affecting this FET 2, an anti-backflow diode 28 for preventing the backflow of over current produced by induced voltage from the battery-side converter circuit 13 to the first primary circuit A of the first unit 4, a limiting resistor 29 (may be omitted) for limiting the over current, and a circuit cutoff fuse 30 (may be omitted). 31 in the figure is a built-in diode of the FET 2, and NF is a noise filter. The primary circuit A is provided with a power outage detection circuit 32 for detecting a power outage from the output of the rectification circuit 22, an internal temperature detection circuit 33 for detecting the internal temperature from information from a temperature sensor 33S that measures the internal temperature, a current balancing circuit 36 for balancing the input current value of the primary circuit B of the second unit 6 at a predetermined balancing ratio such that an input current detection circuit 35 for detecting the input current detected by the secondary winding of a current transformer 34, and the input current thereof, are held at preset values, a malfunction detection circuit 37 for detecting a malfunction of the FET from the output of the FET 2 and the pulse signals of the gate circuit 26, and a switching power supply circuit 39 for driving a cooling fan 38 or ensuring a standby-use auxiliary power supply (+5 V). TH in the figure is an output terminal for outputting the signals from the internal temperature detection circuit 33, CP is an output terminal for outputting the signals from the input current detection circuit 35, CBL is a current balancing terminal (may instead be a load balancing terminal) for connecting the current balancing circuit 36 of the first unit 4 to the current balancing circuit 36 of the second unit 6, UF is an output terminal for outputting the signals from the malfunction detection circuit 37 in a state in which they are electrically insulated by a phototransistor 40, PF is an output terminal for outputting the signals from the power outage detection circuit 32, F.ALM is an output terminal for outputting the signals from the cooling fan 38, and P1 and P2 are output terminals of the primary circuits A or B. Connecting the input/output terminal CBL of the first unit 4 to the input/output terminal CBL of the second unit 6 as above results in the load balancing of the first unit 4 and the second unit 6 by a predetermined balancing ratio, but the two units 4 and 6 may be load-balanced by providing a switching element drive pulse switching control circuit (not shown) for switching the drive pulses for driving the switching elements of the first unit 4 and the second unit 6, and controlling the drive of the units 4 and 6 by this switching element drive pulse switching control circuit, or the two units 4 and 6 may be driven at a preset balancing ratio, or the two units 4 and 6 may be driven at a balancing ratio programmed into the computer that serves as the load 7. This balancing ratio may be set to any value.

Figure 4:
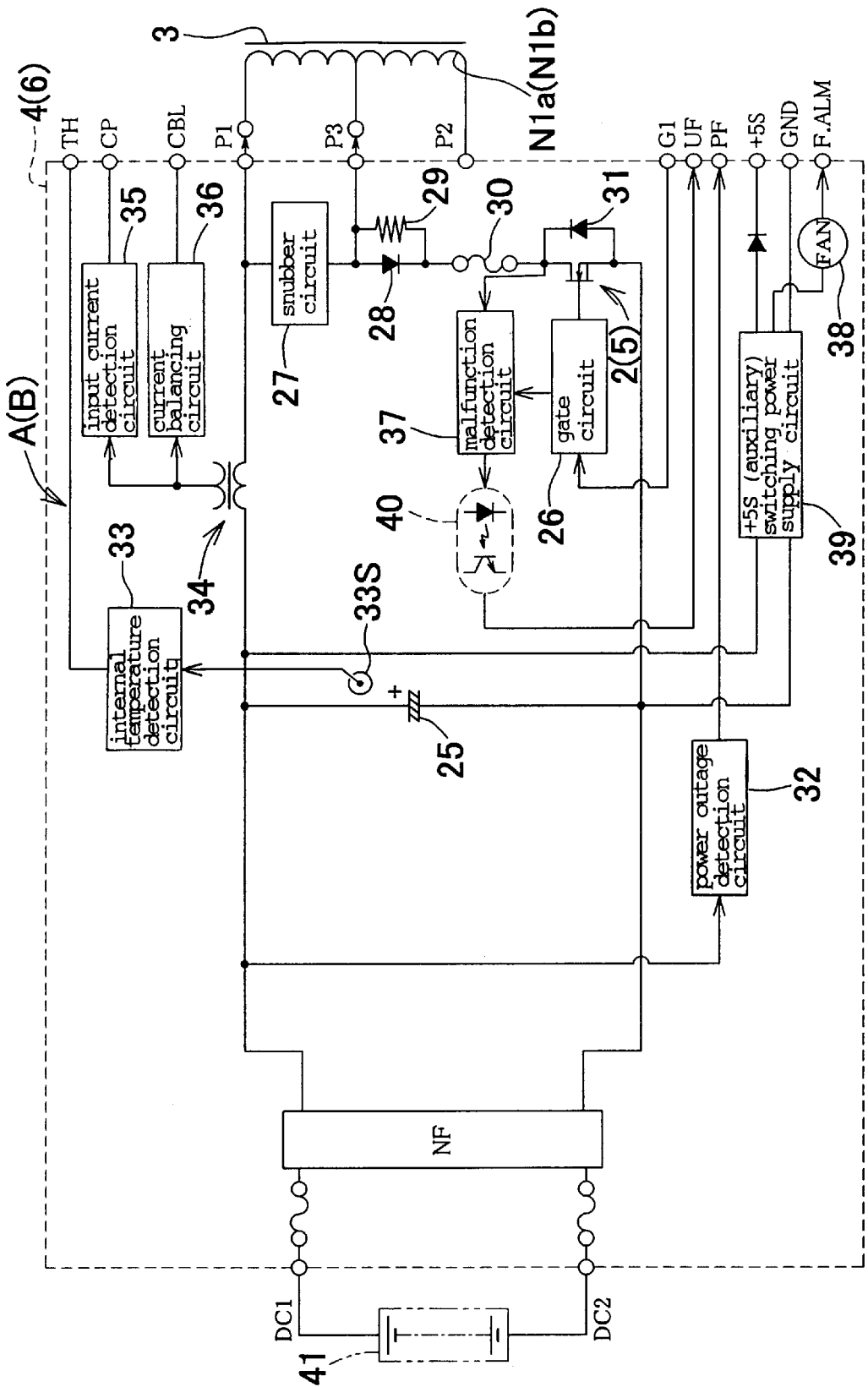
FIG. 4 is an electrical circuit diagram illustrating another structure of the first unit (second unit)

The commercial AC power supply 1 was used for the inputs of both the first unit 4 and the second unit 6, but a DC power supply 41 may instead be used as the input source for either the first unit 4 or the second unit 6. In this case, the rectification circuit 22, surge current prevention circuit 23, and active filter circuit 24 of the primary circuit A or B are unnecessary. Also, the number of turns of the primary winding N1$a$ or N1$b$ connected to the high-frequency transformer 3 is changed to a number of turns corresponding to the DC voltage applied by the DC power supply 41. The output terminals in this case comprise P1 and P3. The rest of the structure shown in FIG. 4 but not described is the same as that in FIG. 2, with the same components labeled the same, and will not be described again. The DC power supply 41 may be a generator, a fuel cell, a solar cell, an atomic cell, or the like. The unit whose input source is this DC power supply 41 may be used together with the unit whose input source is the commercial AC power supply 1, or it may be used only when one of the units cannot be used due to a power outage, damage, etc. Two units are provided in the example given here, but three or more units may also be provided. Increasing the number of units does make the system bulkier, but benefits include greater output, reliability, and durability.

As shown in FIG. 1, the first unit 4 and the second unit 6 can be installed or removed between a connected state in which they are electrically connected to the primary winding N1$a$ or N1$b$ of the high-frequency transformer 3 and a disconnected state in which this connected state has been released, which is accomplished by means of a connector 42 (the connection component). Therefore, if the first primary circuit A or the second primary circuit B should malfunction due to a lightning surge, any of various impulse surges, or the like, the primary circuit can be quickly and easily replaced by removing the malfunctioning primary circuit A or B in the above-mentioned disconnected state, and then attaching a new primary circuit in a connected state by means of the connector 42. When the new primary circuit is put in a connected state by the connector 42, the backflow of over current caused by induced voltage to the primary circuit A or B is prevented by the anti-backflow diode 28, and current flowing to the smoothing capacitor 25 can be controlled by the limiting resistor 29, so even while the battery-side converter circuit 13 is operating, the first unit 4 or the second unit 6 can be removed and installed in a live state without any arcing of the connector 42 and fusion of the contacts, or any damage to the electronic parts (elements, etc.) that make up the primary circuit A or B. The above-mentioned connector 42 consists of a male (or female) connector 42A provided on the casing side (main component side), and a connector 42B provided to the units 4 and 6 so as to allow connection to or separation from this connector 42A.

Figure 6:
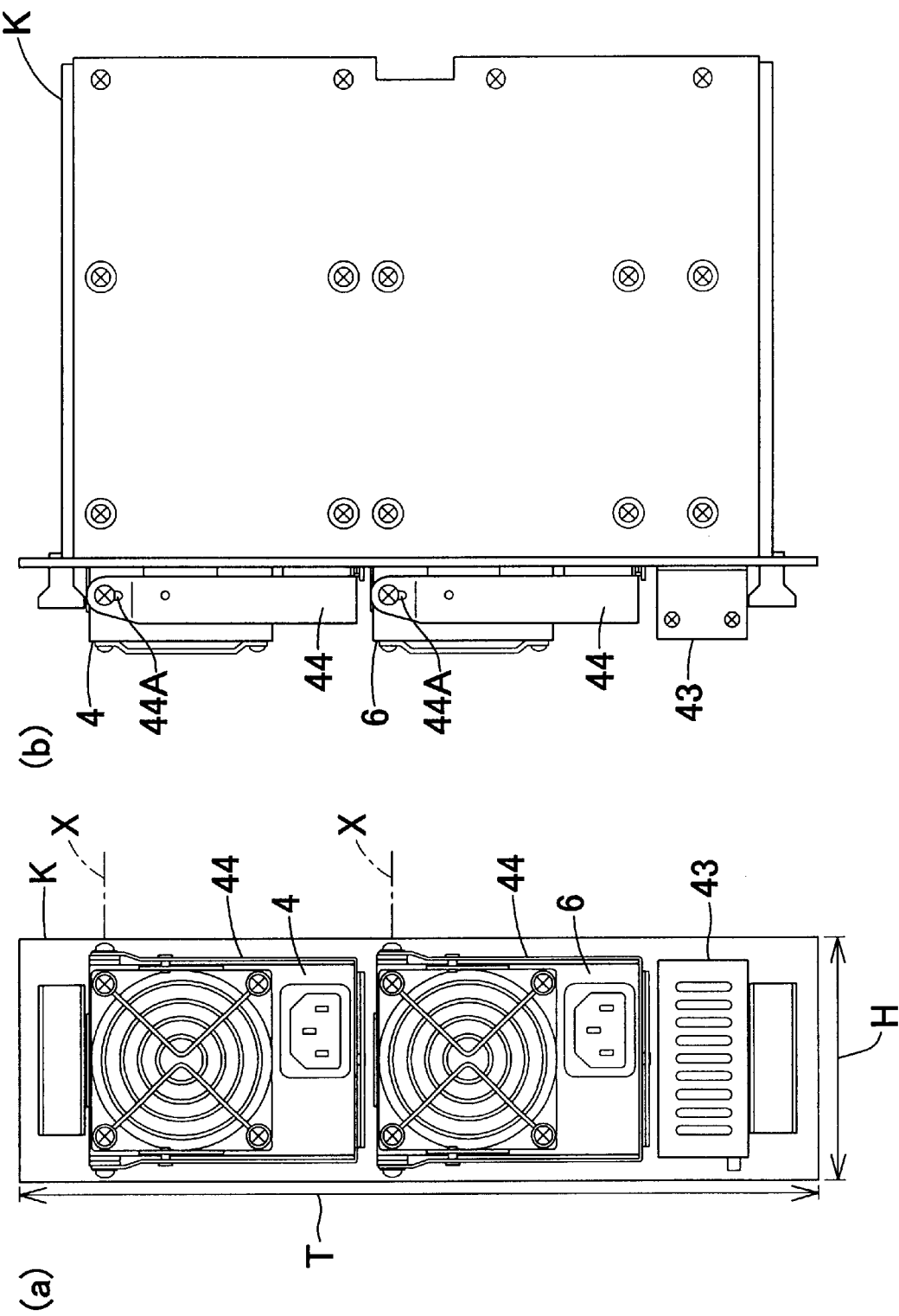
FIG. 6 illustrates an uninterruptible duplexed power supply system, with (a) being a front view thereof and (b) a side view.

The specific structure of a large-capacity uninterruptible duplexed power supply system is shown in FIGS. 6 ($a$) and ($b$). The first unit 4, the second unit 6, and a battery unit 43 equipped with the charging control circuit 14 and the rechargeable battery 12 are disposed in the upper, middle, and lower parts, respectively, of a casing K with a vertical (up and down) dimension T is 6U size (approximately 261 mm) and a horizontal (width) dimension H of 4 slots (approximately 80 mm; available with up to 10 slots (approximately 200 mm)), but the dimensions of the units 4 and 6, the battery unit 43, and the casing K are not limited to those given. With a small-capacity uninterruptible duplexed power supply system, although not shown in the figure, the first unit 4 and the second unit 6 are next to each other in the horizontal (width) direction of the casing K in which the vertical (up and down) dimension is 3U size (approximately 130 mm) and a horizontal (width) dimension of 4 slots (approximately 80 mm; available with up to 10 slots (approximately 200 mm)), with the battery unit 43 disposed above or below the units 4 and 6, but the dimensions of the casing K and the positions of the units are not limited to those given here.

Figure 7:
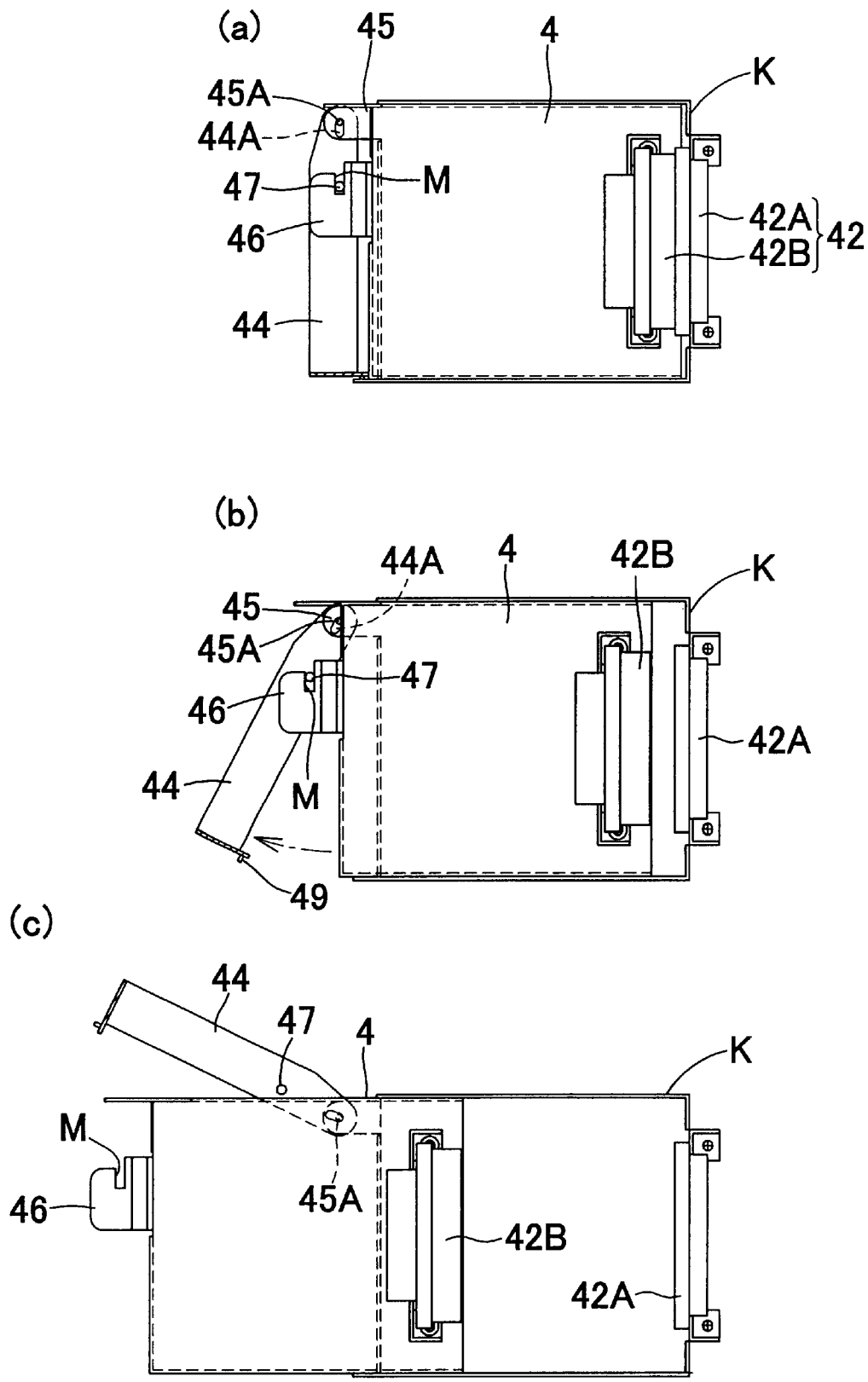
FIG. 7 illustrates the first unit connection and disconnection structure of the uninterruptible duplexed power supply system, with (a) showing the state when the first unit has been installed in the casing, (b) showing the state when the first unit has been pulled forward, and (c) showing the state when the first unit has been removed.
Figure 8:
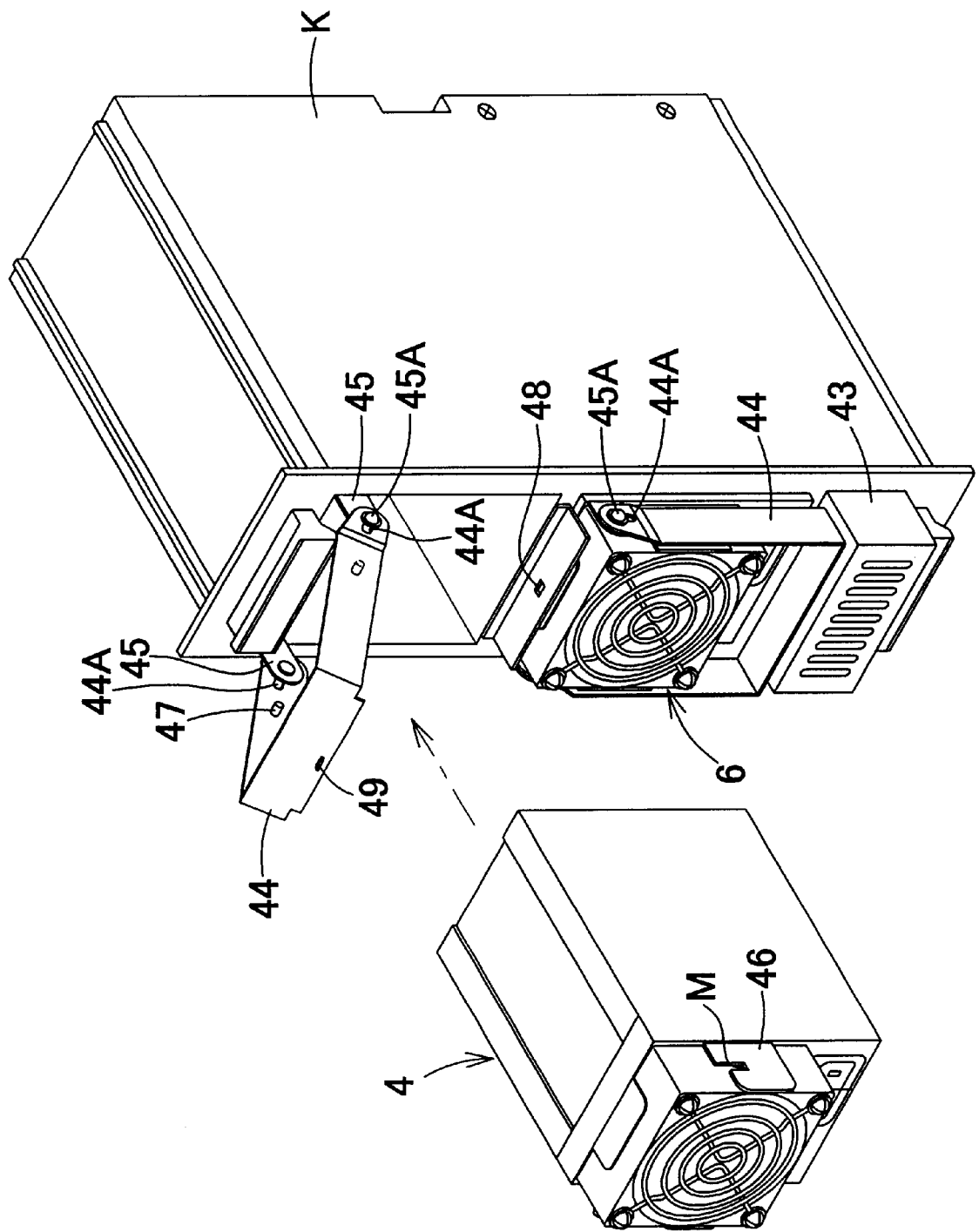
FIG. 8 is an oblique view showing the state just prior to the installation of the removed first unit in the casing.
Figure 9:
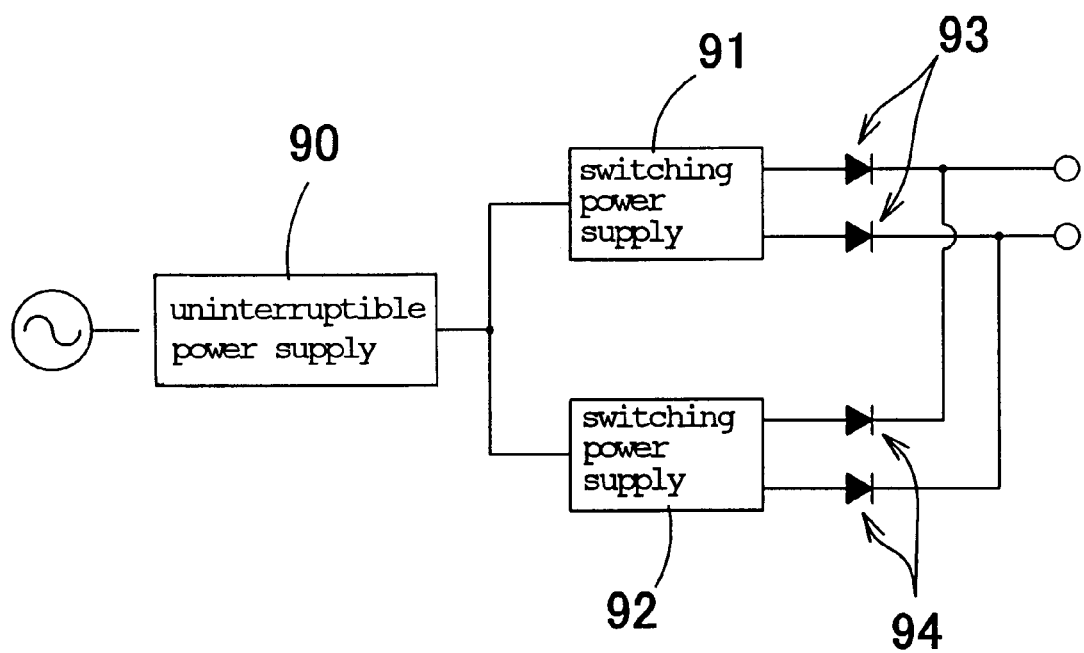
FIG. 9 is a block diagram of the specific structure of a conventional uninterruptible duplexed power supply system.

As shown in FIGS. 6 ($a$) and (b), FIGS. 7 ($a$), ($b$), and ($c$), and FIG. 8, the first unit 4 and the second unit 6 (only the first unit 4 is shown in the figures) are structured such that they can be plugged into a casing through an opening formed in the front thereof, the units 4 and 6 are provided with the connector 42B capable of connecting to or separating from the male (or female) connector 42A provided to the casing side (main component side) in the course of the plugging-in of the units 4 and 6, and a plug-in operation member 44, which is substantially U-shaped in front view, for pushing and moving the fronts of the units 4 and 6 when the units 4 and 6 are plugged in and for pulling and moving the units 4 and 6 when the units 4 and 6 are unplugged is attached to the casing K so as to be swingable substantially around the horizontal axis X of rotational shafts 45A of a pair of left and right brackets 45 attached to the casing K.

A pair of left and right hook members 46 that are substantially L-shaped in side view are attached as latched components to the fronts of the units 4 and 6, there is provided a pair of left and right pins 47 on inner surfaces of left and right vertical plate portions of the plug-in operation member 44 as latching components that latch these hook members 46 when the plug-in operation member 44 is swung in the plug-in direction of the units 4 and 6 and that unlatch when the plug-in operation member 44 is swung in the unplugging direction of the units 4 and 6, and a fixing means is provided for fixing the plug-in operation member 44 to the casing K in a state in which the units 4 and 6 have been completely plugged in.

The above-mentioned fixing means comprises a through hole 48 (the latched components) provided to the casing K, a latch 49 provided to the plug-in operation member 44 so as to be capable of being plugged into and removed from this through hole 48, and slots 44A provided to the plug-in operation member 44 in order to allow the plug-in operation member 44 to move up and down with respect to the rotational shafts 45A in a state in which the units 4 and 6 have been completely plugged in.

Therefore, when the installed unit 4 or 6 is removed from the casing K, first, the plug-in operation member 44 is left in its current orientation (see FIG. 7 (a)) and moved straight up by a distance corresponding to the slots 44A, which removes the latch 49 from the through hole 48 (see FIG. 8) and releases the unit. When the plug-in operation member 44 is swung upward in this state, as shown in FIG. 7 (b), the unit 4 or 6 is moved forward and, at the same time, the connector 42B of the unit 4 to 6 is separated from the connector 42A on the casing side. When the plug-in operation member 44 is swung further upward, the pins 47 move upward from grooves M of the hook members 46 and unlatch the unit, allowing the unit 4 or 6 to be easily removed as shown in FIG. 7 (c). When the sequence is reversed and the unit 4 or 6 is plugged into the casing K, first, the unit 4 or 6 is pushed into the casing K up to a specific location. Then, the plug-in operation member 44 is swung downward, causing the pins 47 to hit the tops of the hook members 46. When the plug-in operation member 44 is swung further from this state, the pins 47 are engaged in the grooves M of the hook members 46 (see FIG. 7 (b)) and, at the same time, both connectors 42A and 42B are connected to complete the plugging in of the unit 4 or 6, and the plug-in operation member 44 is left in its current orientation and moved downward, thereby fixing the unit 4 to 6 to the casing K.

The above-mentioned limiting resistor 29 is provided in order to output to the secondary DC output circuits 8 and 9 the energy stored during the backup operation of the battery-side converter circuit 13 by the smoothing capacitor 25 in order to save the CPU processing contents in an internal backup memory in the event that output cannot be supplied to the secondary DC output circuits 8 and 9 for some reason during, such as a battery power outage or a malfunction of the rechargeable battery 12, during the backup operation of the battery-side converter circuit 13 that is started as a result of interruption of AC output from the commercial AC power supply 1 due to power outage and the like. The smoothing capacitor 25 has an output time of about a few dozen milliseconds. An advantage of providing the limiting resistor 29 is that the above trouble can be eliminated, but this is not absolutely necessary. Also, when the limiting resistor 29 is provided, current will flow as charging current to the smoothing capacitor 25 of the new unit when that unit is put in a connected state by the connector 42, but because the current value is limited by the limiting resistor 29, there will be no arcing, so this current poses no problem.

Figure 5:
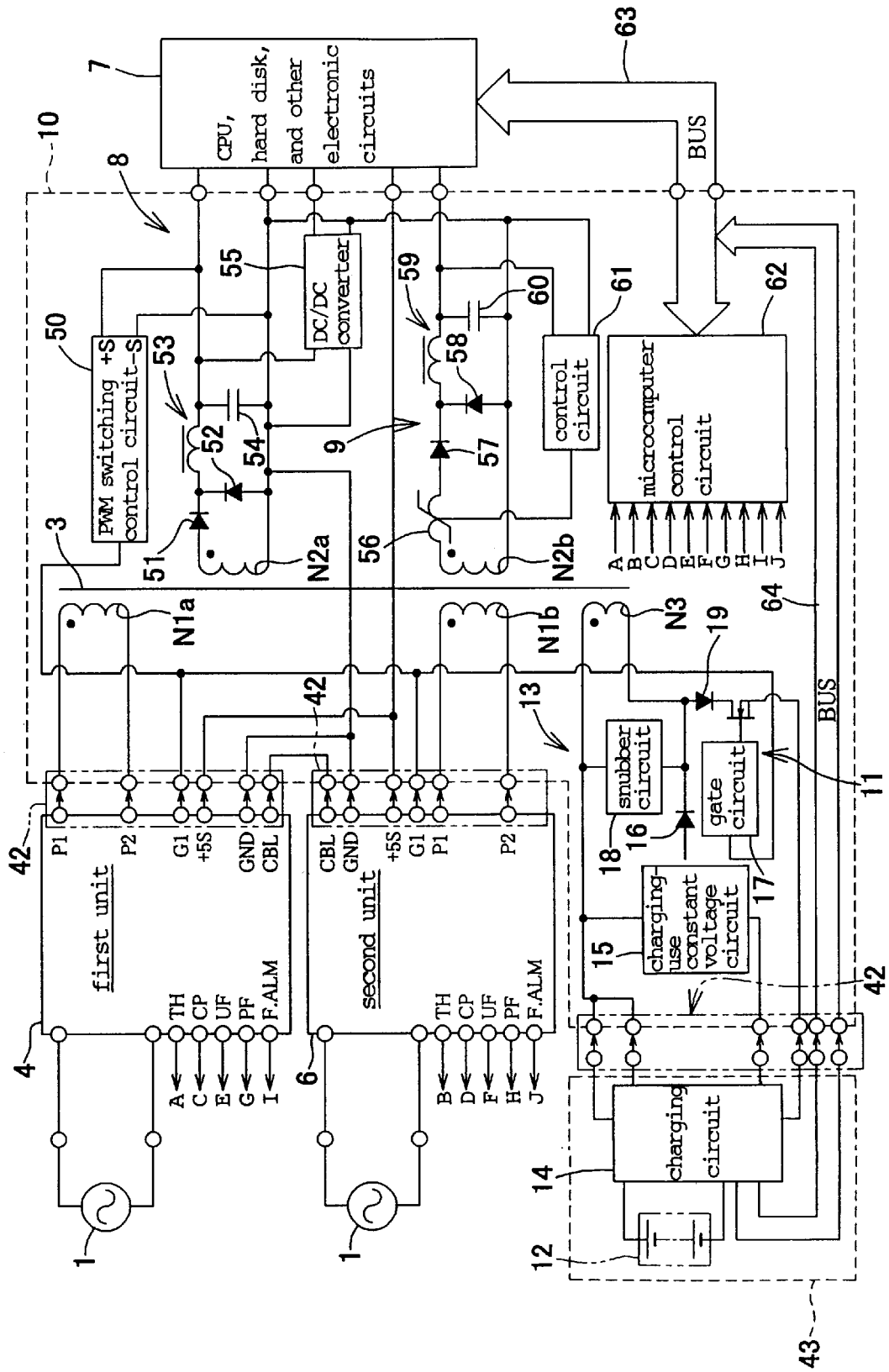
FIG. 5 is an electrical circuit diagram illustrating another structure of an uninterruptible duplexed power supply system.

As shown in FIG. 5, if the battery unit 43 is structured such that it can be attached to and removed from the main component 10 via the connector 42, then the battery can be quickly replaced merely by taking out the dead rechargeable battery 12 and plugging in a new rechargeable battery 12. The rest of the structure shown in the figure but not described is the same as that in FIG. 2, with the same components labeled the same, and will not be described again.

One (circuit 8) of the secondary DC output circuits 8 and 9 constitutes a first DC output circuit to which is connected a PWM switching control circuit 50 for maintaining a constant voltage for the load 7 equipped with a computer or the like equipped with a CPU, a hard disk, other electronic circuits, etc., in which a rectifying diode 51, a commutation diode 52, a smoothing coil 53, and a smoothing capacitor 54 are connected to the secondary winding N2a of the high-frequency transformer 3, and which supplies a specific DC output current to the load 7. A DC/DC converter 55 allows the output from the circuit 8 to be taken off at a different current value from the above-mentioned output. The other circuit 9, although not necessary, constitutes a second DC output circuit in which a magnetic amplifier 56, a rectifying diode 57, a commutation diode 58, a smoothing coil 59, a smoothing capacitor 60, and a control circuit 61 are connected to the secondary winding N2b of the high-frequency transformer 3, allowing for the supply of power at a constant voltage DC current different from that of the DC output power from the circuit 8. Third and fourth DC output circuits may also be provided as needed. Increasing the output in this manner allows the DC output power to be varied as desired according to the capacitance of the load 7 and other factors. Also, using the PWM switching control circuit 50 to control the pulse width of the gate signals outputted from the gate circuits 26 of the units 4 and 6 allows a constant voltage to be maintained for the load 7 via the first DC output circuit 8.

The three switching elements 2, 5, and 11 may be synchronized so that control signals are always outputted from the PWM switching control circuit 50 to the three gate circuits 26, 26, and 17. Also, when the commercial AC power supply 1 is operating normally, the switching elements 2 and 5 of the primary circuits A and B may be put in an operating state and the switching element 11 of the battery-side converter circuit 13 put in an idle or off state in synchronization with the switching elements 2 and 5, but when the voltage from the commercial AC power supply 1 drops below the specified level, the procedure is the reverse of the above, with the switching elements 2 and 5 of the primary circuits A and B being put in an idle or off state in synchronization with the switching element 11, and the switching element 11 of the battery-side converter circuit 13 put in an operating state.

A microcomputer control circuit 62, to which is inputted the information from the five terminals (TH, CP, UF, PF, and F.ALM) provided to each of the primary circuits A and B (for a total of 10 terminals), is connected to the load 7 by a bus 63 equipped with serial transfer means (this bus is bi-directional in the figure, but the transfer may be in just one direction, from the microcomputer control circuit 62 to the load 7), and the charge and discharge information from the charging control circuit 14 is connected by a bus 63 and a bus 64 equipped with serial transfer means. Therefore, the user can take the appropriate action if, based on ten information from A to J and the charge and discharge information from the charging control circuit 14, the various displays are performed, such as a power outage display, a unit malfunction display, a cooling fan malfunction display, a unit internal temperature display, a display of the input current values and balancing ratio of the units, or a display of the status of the rechargeable battery 12, such as the state of charge of the rechargeable battery 12, the battery temperature, the remaining capacity, and the estimated service life,. Also, drive pulse control can be performed by a computer provided to the load 7 so that the detected balancing ratio will be the predetermined balancing ratio.

With a phase 1 of the present invention, the primary circuit and the battery-side converter circuit are connected in parallel to the load via a high-frequency transformer. As a result, the system is more compact (takes up less space) and is more efficient, and even if the primary circuit should malfunction due to lightning surge, any of various impulse surges, or the like, power will be supplied instantaneously from the rechargeable battery, so the load can be driven continuously, without interruption, and reliability is higher. Moreover, the malfunction of the primary circuit can be eliminated quickly and easily merely by replacing the malfunctioning primary unit with a new primary unit while the load is in a drive state, which affords an uninterruptible duplexed power supply system that is even more reliable. Furthermore, because the entire unit is replaced, even an unskilled worker with little electrical knowledge can replace the primary unit as long as there is a new one, allowing the malfunction to be dealt with more speedily. Also, a malfunction of the power supply circuit can be eliminated in a live state, so the replacement is even faster.

If two units are provided on the primary side, such as when two units are driven alternately, or just one is driven and the other is reserved for emergency drive, then the durability of the units will be better than when only one unit is provided. Moreover, even if one unit malfunctions, continuous drive is afforded by the other unit. Another advantage is that drive can be continued up until the malfunctioning unit is repaired.

With a phase 2 of the present invention, one of the input sources of the two units on the primary side is a DC power supply, so even if the commercial AC power supply should be cut off, the load can still be continuously driven by the DC power supply, affording an uninterruptible duplexed power supply system with high reliability.

With a phase 3 of the present invention, load balancing terminals or current balancing terminals are provided to the first and second units, and the load balancing terminals or current balancing terminals of these units are connected to each other, or a switching element drive pulse switching control circuit is provided for switching the drive pulses for driving the switching elements of the first unit and second unit, and the drive of the two units is controlled by this switching element drive pulse switching control circuit, thereby balancing the loads of the two units, or driving the two units at a preset balancing ratio, or driving the two units at a balancing ratio programmed into the computer that serves as the load, and thereby achieving higher efficiency.

With a phase 4 of the present invention, there are provided a malfunction detection circuit for detecting a malfunction of the first unit or second unit, a power outage detection circuit, an internal temperature detection circuit for detecting the internal temperatures of the two units, a cooling fan abnormal shutdown detection circuit for detecting the abnormal shutdown of a cooling fan, an input current detection circuit and current balancing detection circuit for the two units, and a charging control circuit for detecting the state of the rechargeable battery, such as the charge or discharge state of the rechargeable battery, the battery temperature, the remaining capacitance, or the estimated service life, and maintenance is performed by transferring the detection signals from all of the above circuits by serial transfer to the computer that serves as the load. As a result, the status of the uninterruptible duplexed power supply system can be ascertained, appropriate action taken, and serious damage or the like prevented.

With a phase 5 of the present invention, unit replacement or maintenance of the machine containing the unit can be carried out easily by plugging and unplugging the unit into and from the casing. The connection and separation of the connectors whose numerous contacts are fitted together are facilitated by utilizing the swing force of the plug-in operation member when the unit is plugged in and unplugged.

With a phase 6 of the present invention, the plug-in operation member can be engaged with and disengaged from the unit merely by swinging this plug-in operation member, allowing the plug-in to be carried out more quickly. Also, fixing the plug-in operation member to the casing by the fixing means in a state in which the unit has been completely plugged in effectively avoids the unintentional movement and unplugging of the unit.

With a phase 7 of the present invention, the latching component of the plug-in operation member can be latched to the latched component on the casing side, and the unit fixed to the casing merely by moving the plug-in operation member up or down when the unit has been completely plugged in. therefore, fixing and releasing can be carried out more easily and quickly than when screws are used, for example.

What is claimed is:

1. An uninterruptible duplexed power supply system, comprising:
   a first unit that uses a first power supply as its input source and that houses a first primary circuit equipped with a switching element on the output side; and
   a second unit that uses the first power supply or a second power supply that is different from the first power supply and that houses a second primary circuit equipped with a switching element on the output side;
   wherein a main component to which the outputs of the first unit and second unit are inputted comprises:
      a primary winding of a high-frequency transformer to which the first unit and the second unit are connected via a connection component;
      a secondary DC output circuit that is connected to a secondary winding of the high-frequency transformer and supplies electrical power to a load;
      a PWM control circuit for keeping the output from this secondary DC output circuit at a constant voltage; and
      a battery-side converter circuit that is connected via a tertiary winding of the high-frequency transformer, is equipped with a switching element on the output side, and is used for charging a rechargeable battery for backup in the event of a power outage;
   wherein the first unit and the second unit are removably installed in a live state between a connected state in which they are electrically connected to the two primary windings of the high-frequency transformer and a disconnected state in which this connected state has been released; and
   wherein the output signals from the PWM control circuit are controlled and inputted to the gate circuits of the various switching elements of the first unit, second unit, and battery-side converter circuit.

2. The uninterruptible duplexed power supply system according to claim 1, wherein, when the input source of either the first unit or the second unit is a DC power supply, the number of turns of the primary winding for connecting said first unit or second unit to the high-frequency transformer is changed to a number of turns corresponding to the DC voltage applied by said DC power supply.

3. The uninterruptible duplexed power supply system according to claim 1 or 2, wherein the first unit and the second unit are each equipped with a load balancing terminal or a current balancing terminal, and the load balancing terminals or current balancing terminals of these units are connected to each other, or a switching element drive pulse switching control circuit is provided for switching the drive pulses for driving the switching elements of the first unit and second unit, and the drive of the two units is controlled by this switching element drive pulse switching control circuit, whereby the loads of the two units are balanced, or the two units are driven at a preset balancing ratio, or the two units are driven at a balancing ratio programmed into the computer that serves as the load.

4. The uninterruptible duplexed power supply system according to claims 3, comprising:

a malfunction detection circuit for detecting a malfunction of the first unit or second unit;

a power outage detection circuit;

an internal temperature detection circuit for detecting the internal temperatures of the two units;

a cooling fan abnormal shutdown detection circuit for detecting the abnormal shutdown of a cooling fan;

an input current detection circuit and current balancing detection circuit for the two units; and a charging control circuit for detecting the state of the rechargeable battery, such as the charge or discharge state of the rechargeable battery, the battery temperature, the remaining capacitance, or the estimated service life;

and wherein maintenance is performed by transferring the detection signals from all of the above circuits by serial transfer to the computer that serves as the load.

5. A unit plug-in structure in an uninterruptible duplexed power supply system, wherein at least one of the first unit and second unit according to claim 1 is structured such that it can be plugged into a casing through an opening formed in the front thereof, the unit is provided with a connector capable of connecting to or separating from a connector provided to the casing side in the course of the plugging-in or unplugging of the unit, and a plug-in operation member for pushing and moving the front of the unit when this unit is plugged in and for pulling and moving the unit when this unit is unplugged is attached to the casing so as to be swingable substantially around the horizontal axis.

6. The unit plug-in structure in an uninterruptible duplexed power supply system according to claim 5, wherein the plug-in operation member is equipped with a latching component that latches with a latched component provided to the front of the unit when the plug-in operation member is swung in the plug-in direction of the unit and that unlatches when the plug-in operation member is swung in the unplugging direction of the unit, and there is provided fixing means for fixing the plug-in operation member to the casing in a state in which the unit has been completely plugged in.

7. The unit plug-in structure in an uninterruptible duplexed power supply system according to claim 6, the fixing means comprising:

a latched component that is privided to the casing;

a latching component provided to the plug-in operation member so as to be able to latch and unlatch the latched component; and a slot provided to a rotary shaft of the plug-in operation member so that the plug-in operation member will be able to move up and down when the until has been completely plugged in.

* * * * *